United States Patent
Rudolph et al.

(10) Patent No.: US 7,001,026 B2
(45) Date of Patent: Feb. 21, 2006

(54) ASSEMBLY FOR PROJECTING AN IMAGE ONTO A PROJECTION SURFACE

(75) Inventors: Guenter Rudolph, Jena (DE); Eberhard Piehler, Lehesten (DE); Dirk Muehlhoff, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 13 days.

(21) Appl. No.: 10/433,534

(22) PCT Filed: Jun. 4, 2002

(86) PCT No.: PCT/EP02/06124

§ 371 (c)(1),
(2), (4) Date: Jan. 28, 2004

(87) PCT Pub. No.: WO02/100113

PCT Pub. Date: Dec. 12, 2002

(65) Prior Publication Data

US 2004/0119946 A1    Jun. 24, 2004

(30) Foreign Application Priority Data

Jun. 7, 2001 (DE) .............................. 101 27 621

(51) Int. Cl.
*G03B 21/14* (2006.01)

(52) U.S. Cl. ............................................ 353/98; 349/7
(58) Field of Classification Search ............... 353/31, 353/33, 34, 37, 98, 122, 99, 69, 70; 349/5, 349/7, 8, 9; 348/742, 743, 771
See application file for complete search history.

(56) References Cited

U.S. PATENT DOCUMENTS

| | | | |
|---|---|---|---|
| 2,742,817 A | 4/1956 | Altman | |
| 4,861,142 A | 8/1989 | Tanaka et al. | |
| 5,032,021 A | 7/1991 | Kanatani et al. | |
| 5,239,322 A | 8/1993 | Takanashi et al. | |

(Continued)

FOREIGN PATENT DOCUMENTS

DE         43 24 849 A1    2/1995

(Continued)

OTHER PUBLICATIONS

"Harness the Brilliance of LCoS", Mitsui & Co., Ltd.

(Continued)

*Primary Examiner*—William C. Dowling
(74) *Attorney, Agent, or Firm*—Patterson, Thuente, Skaar & Christensen, P.A.

(57) ABSTRACT

In an apparatus for projecting a picture on a projection screen, having a light source (1) emitting light, whereby a luminous area (3) can be generated with said light, having a reflective light modulator (12, 13, 14) that can receive the light emitted from the luminous area (3) and modulates it for the purpose of generating a picture, and further having a projection optics (16) arranged following the light modulator (12, 13, 14) in order to project the picture on the projection screen (17), wherein an optics system (7, 23, 31, 33, 34) is arranged in front of the light modulator (12, 13, 14), wherein the optics system images the light received from the luminous area (3) on the light modulator (12, 13, 14) on the one hand, and on the other hand images the light modulated by means of the light modulator (12, 13, 14) in order to generate a picture in the intermediate image level (ZE) that can be projected on the projection screen by the projection optics.

28 Claims, 10 Drawing Sheets

U.S. PATENT DOCUMENTS

Figure 1:
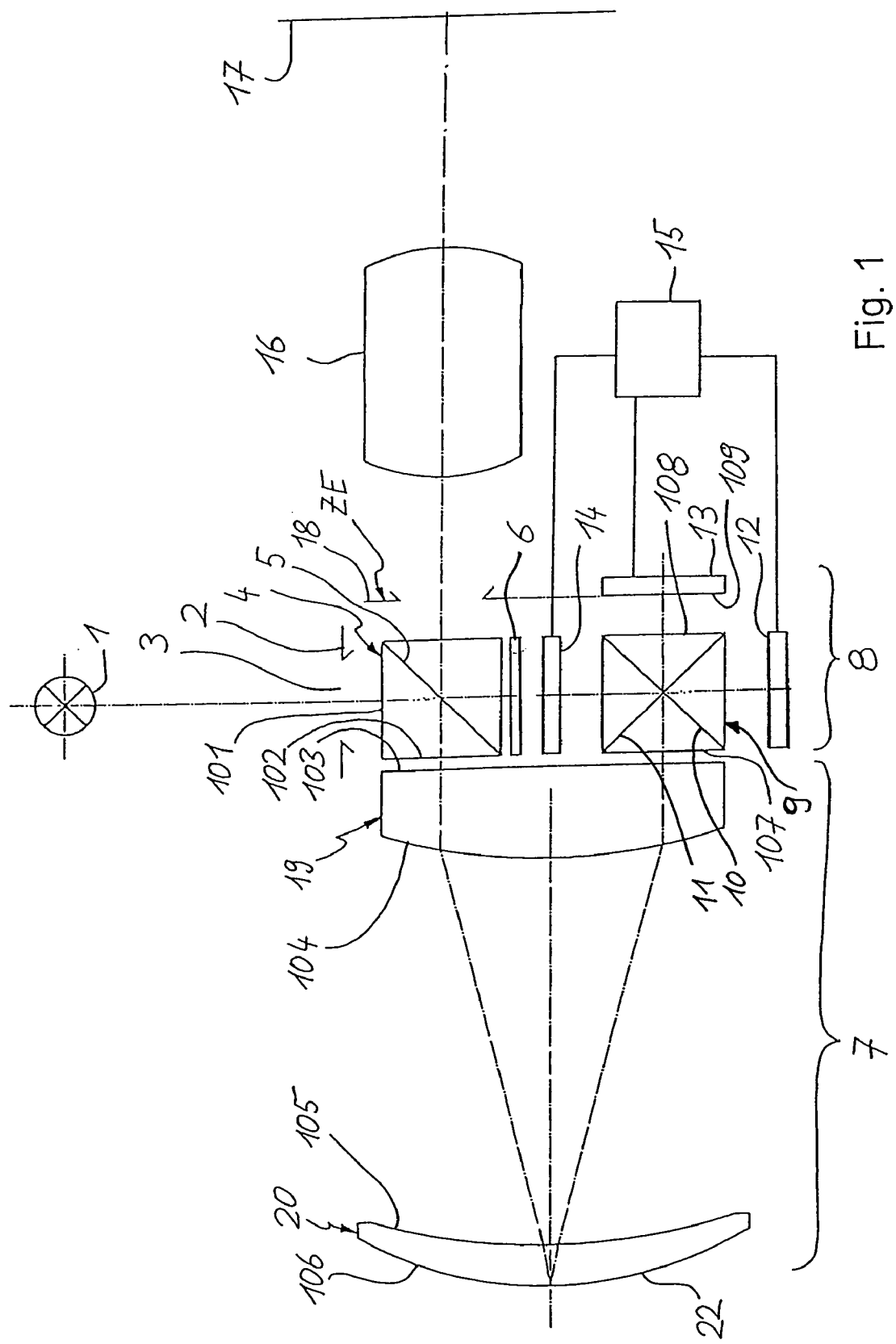

| | | | |
|---|---|---|---|
| 5,300,942 A | 4/1994 | Dolgoff | |
| 5,530,489 A | 6/1996 | Henderson et al. | |
| 5,580,146 A | 12/1996 | Maslow | |
| 5,633,755 A * | 5/1997 | Manabe et al. | 359/443 |
| 5,694,180 A | 12/1997 | Deter et al. | |
| 5,900,982 A | 5/1999 | Dolgoff et al. | |
| 5,978,136 A | 11/1999 | Ogawa et al. | |
| 6,120,152 A | 9/2000 | Nakayama et al. | |
| 6,439,726 B1 * | 8/2002 | Piehler | 353/98 |
| 2003/0223044 A1 * | 12/2003 | Janssen | 353/20 |

FOREIGN PATENT DOCUMENTS

| | | |
|---|---|---|
| DE | 694 16 126 T2 | 7/1999 |
| DE | 199 07 345 A1 | 9/2000 |
| DE | 199 63 312 A1 | 9/2000 |
| EP | 0 537 708 A1 | 4/1993 |
| EP | 0 734 183 A2 | 9/1996 |
| EP | 1 024 395 A2 | 8/2000 |
| EP | 1 033 614 A2 | 9/2000 |
| EP | 1 039 784 A1 | 9/2000 |
| EP | 1 043 620 A2 | 10/2000 |
| EP | 1 052 856 A2 | 11/2000 |
| EP | 1 055 944 A1 | 11/2000 |
| EP | 1 055 954 A1 | 11/2000 |
| EP | 1 055 955 A2 | 11/2000 |
| EP | 1 056 071 A1 | 11/2000 |
| WO | WO 93/08501 A1 | 4/1993 |
| WO | WO 98/35264 | 8/1998 |
| WO | WO 99/19758 | 4/1999 |
| WO | WO 99/26103 | 5/1999 |
| WO | WO 99/27410 | 6/1999 |
| WO | WO 00/31579 | 6/2000 |

OTHER PUBLICATIONS

Matthew Bone et al., "Novel Optical System Design for Reflective CMOS Technology," S-VISION Inc.

International Search Report.

Caldwell et al., "Compact Projection Optics for Dual DMD Projectors," *SPIE Conference Proceedings*, 1998 (2 pgs.).

* cited by examiner

ASSEMBLY FOR PROJECTING AN IMAGE ONTO A PROJECTION SURFACE

The invention relates to an apparatus for projecting a picture on a projection screen, having a light source that emits light that allows a luminous area to be generated, a reflective light modulator that can be illuminated with light emitting from the luminous area and modulate it for the purpose of generating a picture, and further having a projection optics arranged following the light modulator, such that the projection optics can be illuminated with modulated light in order to project the picture on the projection screen.

In such an apparatus, as is described in EP 0 734 183 A2, for example, the required focal intercept of the projection optics is very large since in view of the utilization of the reflective light modulator, the optics systems for illuminating the light modulator and the projection optics must be provided on the same side of the light modulator. This generates a very complicated projection optics with numerous lenses which makes projection optics expensive and weighty.

Based on this information, it is the object of the present invention to improve an apparatus of the above-mentioned kind for projecting a picture on a projection screen in such a way that its design is simplified.

Taking an apparatus of the above-mentioned kind for projecting a picture on a projection screen, the object is completed by connecting an optics system to the light modulator in front, wherein such optics system images the light coming by way of the luminous area on the one hand and on the other hand images the light coming by way of the light modulator into one of the intermediate image level in order to generate an intermediate image in the intermediate image level such that such intermediate image is projected by the projection optics on the projection screen, thereby becoming the picture.

By arranging for an optics system that generates the intermediate image (preferably a real intermediate image) in the intermediate image level located in front of the projection optics wherein the intermediate image level may preferably also be located immediately in front of the projection optics, the required focal intercept of the projection optics of the apparatus according to the invention is much smaller than in the apparatus of the above-mentioned kind. This also lowers the optical requirements of the projection optics substantially, of course, so that the design of the projection optics is noticeably simplified. The number of required lenses of the projection optics is lower, in particular, which advantageously allows for a weight reduction.

In addition, the projection optics may be interpreted and designed completely independently from the rest of the apparatus since its task is to image the intermediate image generated in the intermediate image level, and not the reflecting area of the light modulator, on the projection screen.

Also, in the apparatus according to the invention, the projection optics may easily be replaced by another projection optics so that the apparatus according to the invention may be easily adapted to diverse basic conditions, such as a wide angle projection or a projection where the optical axis of the projection optics includes an angle unequal to 90 degrees with the projection screen.

Since the optics system images the luminous area on the light modulator, it thereby completely assumes the function of a lighting optics otherwise to be provided separately, located between the luminous area and the light modulator and serving as the illuminator of the light modulator, so that no lighting optics has to be included in the apparatus according to the invention.

The light modulators which are preferably reflective light modulators (which advantageously allow the realization of a very compact apparatus) have an image-generating area (rectangular, for instance) with a majority of image pixels that can be selected independently from each other, from which the incoming light is being reflected modulated (such as with respect to its angle of reflection or direction of polarization), wherein reflected light is utilized in a first state of modulation for bright picture elements, and reflected light in a second state of modulation is utilized for dark picture elements, so that hereby pictures (or color frames) are generated on the light modulators or their image-generating areas. The light modulators can be designed in such a way, of course, that light is reflected only by the pixels of the bright picture elements, while no light emanates from the pixels of the dark picture elements.

The light modulators, which are preferably reflective light modulators, (which advantageously allow the realization of a very compact apparatus) have an image-generating area (rectangular, for instance) with a majority of image pixels that can be selected independently from each other, from which the incoming light is being reflected modulated (such as with respect to its angle of reflection or direction of polarization), wherein reflected light is utilized in a first state of modulation for bright picture elements, and reflected light in a second state of modulation is utilized for dark picture elements, so that hereby pictures (or color frames) are generated on the light modulators or their image-generating areas. The light modulators can be designed in such a way, of course, that light is reflected only by the pixels of the bright picture elements, while no light emanates from the pixels of the dark picture elements. [Repeated paragraph is in the original—Translator's note]

In a preferred embodiment of the apparatus according to the invention, the optics system is a 1:1 image optics. This preferably means that the intermediate image has the same size as the picture set in the light modulator, which means that the lens diameter of the projection optics can be kept small.

The optics system of the apparatus according to the invention can particularly be symmetric, which on the one hand simplifies the manufacturing process and on the other hand allows for the image fields they generate to be very small (in an optimal case, they are practically zero).

The optics system of the apparatus according to the invention can be such that the image-generating part of the light modulator is being reflected in the intermediate image with a reduction in size. The result is that the optical elements of the projection optics may be smaller which means that a weight reduction is accomplished and the production of the projection optics is simplified.

The optics system of the apparatus according to the invention preferably includes a curved mirror. This causes the path of the rays inside the optics system to be folded so that the apparatus according to the invention can be very compact. In that, the optics system may be structured in such a way that each ray passes through the other optics elements of the optics system twice because of the fact that the ray is folded through the mirror, so that the number of the required optics elements may be noticeably reduced. This enables an easier and faster production of the optics system of the apparatus according to the invention.

It is particularly preferred if the optics system has a symmetrically curved mirror, since in such a case, the image fields generated are practically zero and thus non-existent. Also, the curved mirror contributes not only to the folding of the ray, but also to the image itself, so that the number of optical elements of the optics system may be reduced as well.

Another preferred embodiment of the apparatus according to the invention consists of the mirror of the optics system having a spherical curve. This simplifies the production of the mirror which means that an inexpensive optics system can be provided, which leads to an overall cost-effectiveness of the apparatus according to the invention.

In addition, the mirror in the apparatus according to the invention may consist of a reflective coating on a curved boundary surface of a transparent optics element turned away from the light modulator. The advantage is that the number of adjusting elements of the optics system to be adjusted is reduced, so that it can be produced more quickly. Also, the reflective coating is administered on the boundary surface, thereby not comprising an open silvered boundary surface which could be contaminated easily. This ensures the reflective and imaging characteristics of the optics system.

In one preferred embodiment of the apparatus according to the invention, the optics system is a catadioptrics optics (an optics that includes at least one imaging mirror and at least one imaging lens). Such optics allows for particularly good imaging characteristics at a small size with few optics elements, so that an advantageous weight reduction can be accomplished, as well.

A particularly preferred embodiment of the apparatus according to the invention allows for the light source to emit multicolored light, and includes a color unit between the optics system and the light modulator, and a second reflecting light modulator is arranged following the color unit, where the color unit may be illuminated with light from the luminous area via the optics system and then separates light in a first color and directs it to a first light modulator, and separates light in a second color and directs it to a second light modulator, wherein the light modulators modulate the light shining on them, in order to generate a color picture, and wherein the modulated light is superimposed with the aid of the color unit to form a combined luminous beam which is applied to the optics system so that a multicolored image is being generated in the intermediate image level. In this embodiment, the focal intercept advantageously does not have to be enlarged, even though the color unit is provided in-line, since the optics system generates an intermediate image of the partial pictures set on the intermediate image level.

The apparatus according to the invention can in particular include a third reflective modulator arranged following the color unit, wherein the color unit separates light of a third color from the light it is illuminated with, and directs it to a third light modulator that modulates the light shining thereon, in order to generate a third color frame, and wherein the modulated light of the light modulators is superimposed by means of the color unit forming a common luminous beam that is applied to the optics system. Since three light modulators for three different color frames are provided, a brilliant color frame consisting of the superimposed color frames can be generated without a problem.

Color frames in the primary colors red, green, and blue are preferably generated by the light modulators, from which the desired multi-colored picture with a high color brilliance may be generated.

In another preferred embodiment of the apparatus according to the invention, the light modulators are designed in such a way that they modulate the state of polarization, particularly the direction of polarization, of the light shining on them preferably linearly, wherein the light modulators are preferably realized by reflective LCD modulators.

This enables the creation of polarization-modulated pictures or color frames by the light modulators. In such cases, an analyzer arranged in front of the intermediate image level is provided that can be illuminated with the modulated light or the light modulator or modulators, thus causing only light with a pre-determined state of polarization to pass into the intermediate image level. This preferably causes only the light from the pixels made bright by the light modulators to pass into the intermediate image level and then be projected on the projection screen by the projection optics.

The analyzer is preferably located between the intermediate image level and the optics system, thereby allowing for a very compact construction of the apparatus according to the invention.

In another advantageous embodiment of the apparatus of the invention, the analyzer is realized by a polarizing beam splitter, on which the light received from the luminous area shines and which then only passes on linearly polarized light of a first polarized direction to the optics system, so that the light modulator or modulators having linearly polarized light of the first polarized direction is illuminated via the optics system. Further, the light reflected by the light modulator or modulators via the optics system in turn shines on the polarizing beam splitter that allows only linearly polarized light of a second polarized direction that is turned at 90 degrees vis-à-vis the first polarized direction to pass through to the intermediate image level. By utilizing the polarizing beam splitter as a polarizer for the illumination light of the light modulators and as an analyzer for the projector light received from the light modulators, the apparatus according to the invention can be very compact (thus, the path of the illumination rays and the path of the projector rays in the optics system can overlap completely).

In particular, the light modulator may also be a tilting mirror matrix that includes numerous tilting mirrors provided in lines and columns, wherein the mirrors may be tilted independently from each other in at least a first and a second tilting position. In that case, the apparatus according to the invention is provided in such a way that the light reflected by the mirrors in the first tilting position reaches the intermediate image level, while the light reflected by the mirrors in the second tilting position does not reach the intermediate image level. The tilting mirrors advantageously allow for an apparatus according to the invention, wherein the light illuminating the tilting mirror matrix does not have to be specially polarized, so that the losses incurred by a polarization of the light can be avoided.

In particular, the apparatus according to the invention may also be developed further, such that the optics system consists of a plano-convex lens and a silvered meniscus lens, wherein the boundary surface of the meniscus lens turned away from the plano-convex lens is silvered. The lens diameters are chosen large enough for each lens to be passed through twice in one reflection. In that case, the optics system includes only two optics elements which means that the manufacturing costs and the adjustment needed are minor. Thus, an apparatus according to the invention is provided that can be manufactured very cost-efficiently overall.

It is also possible, of course, to replace the one plano-convex lens with two plano-convex lenses having a smaller diameter which are then passed through only once for each image. In such cases, the optics system includes 3 elements, but due to their clearly smaller diameter, the production of the two plano-convex lenses is simpler than the production of the plano-convex lens with a large diameter.

In another advantageous embodiment of the apparatus according to the invention, the optics system includes not only a concave, but also a convex mirror. Thus, an optics system can be realized by no more than reflecting mirrors so that no lenses manufactured in a complicated manner and from expensive materials are needed. This, too, allows for a cost-effective realization of the apparatus according to the invention.

In addition, the apparatus according to the invention can also include a control unit that triggers the light modulator or modulators on the basis of pre-determined picture data and that generates the desired picture or color frames with the light modulator or modulators.

Figure 2:
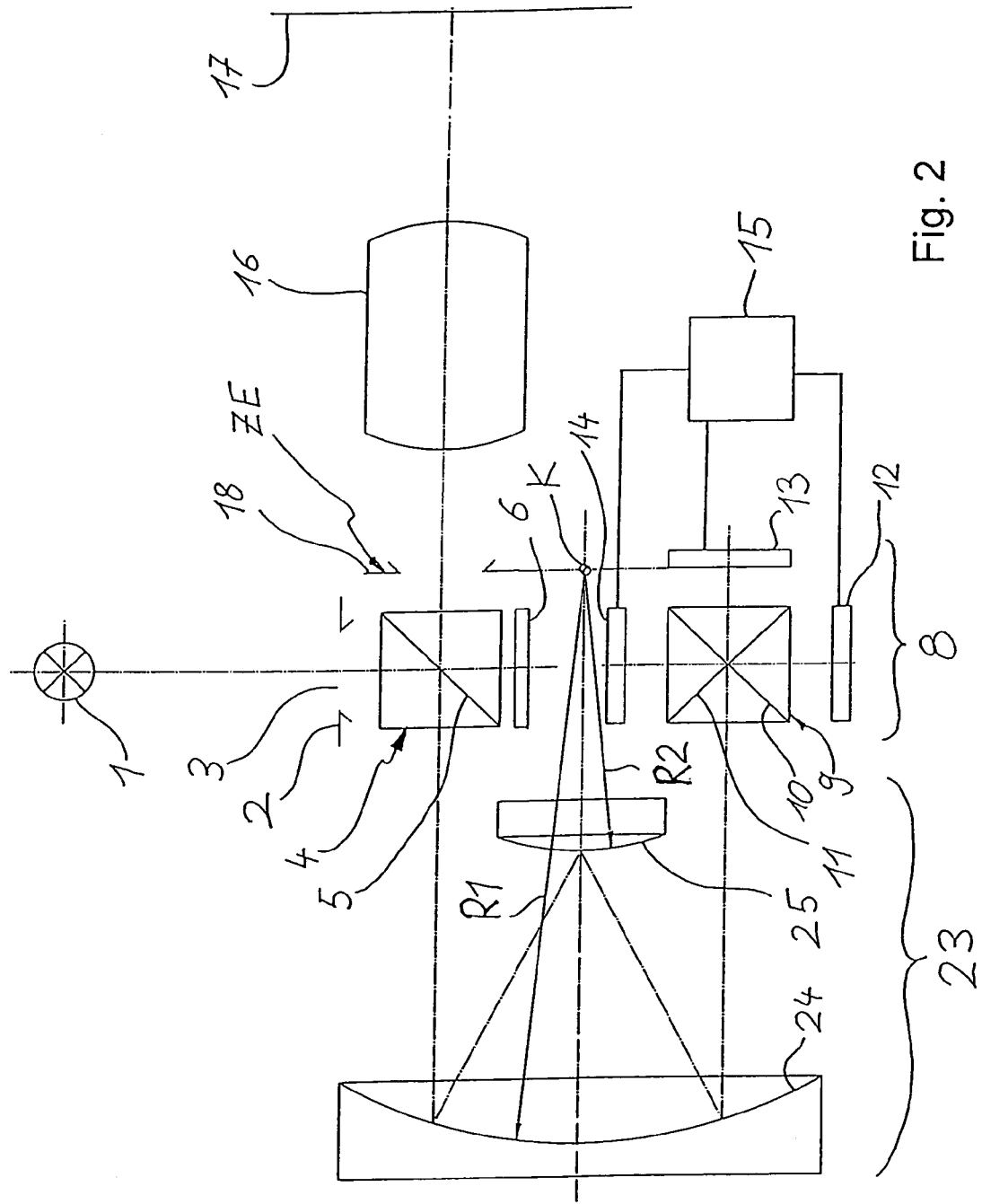
Figure 3:
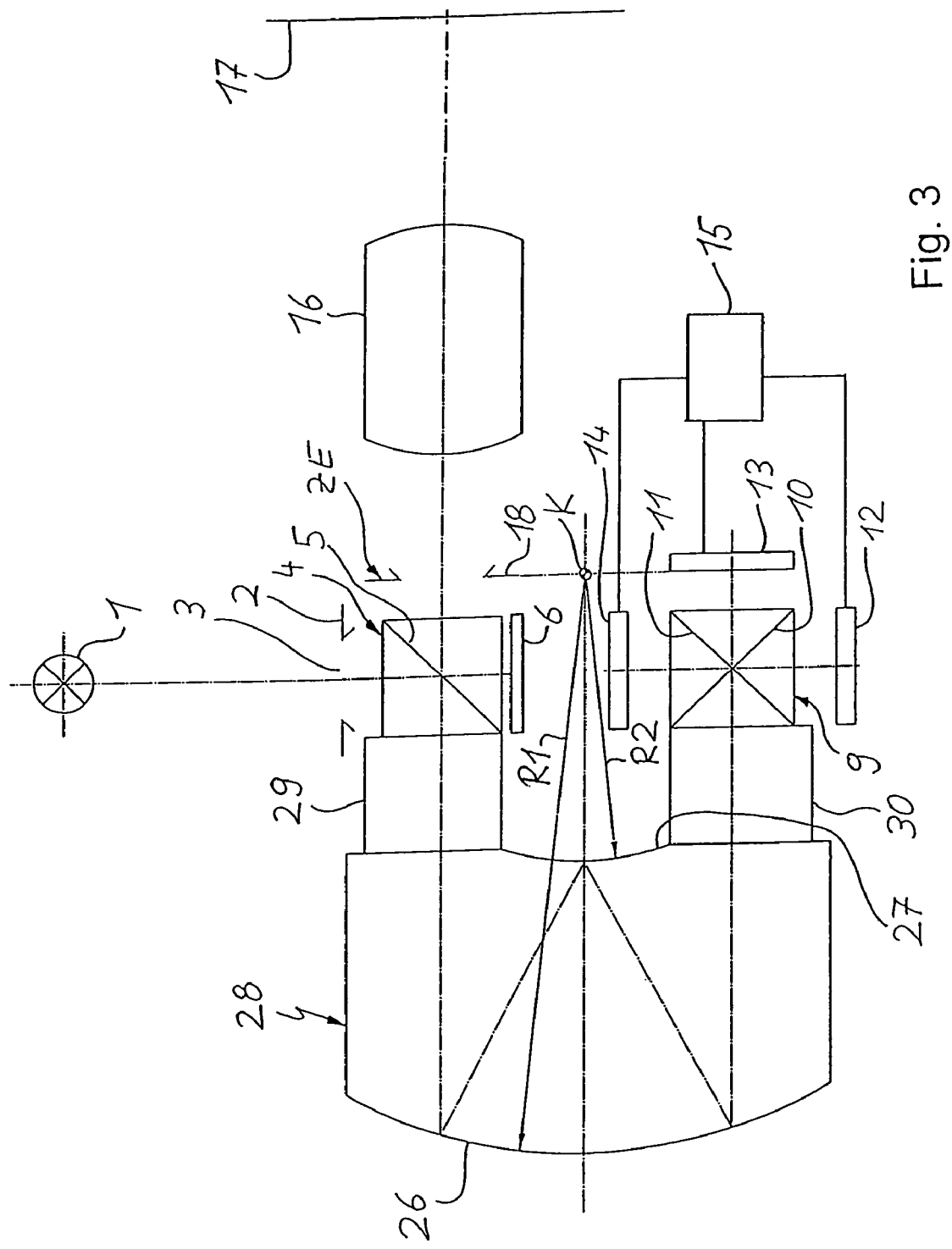
Figure 4:
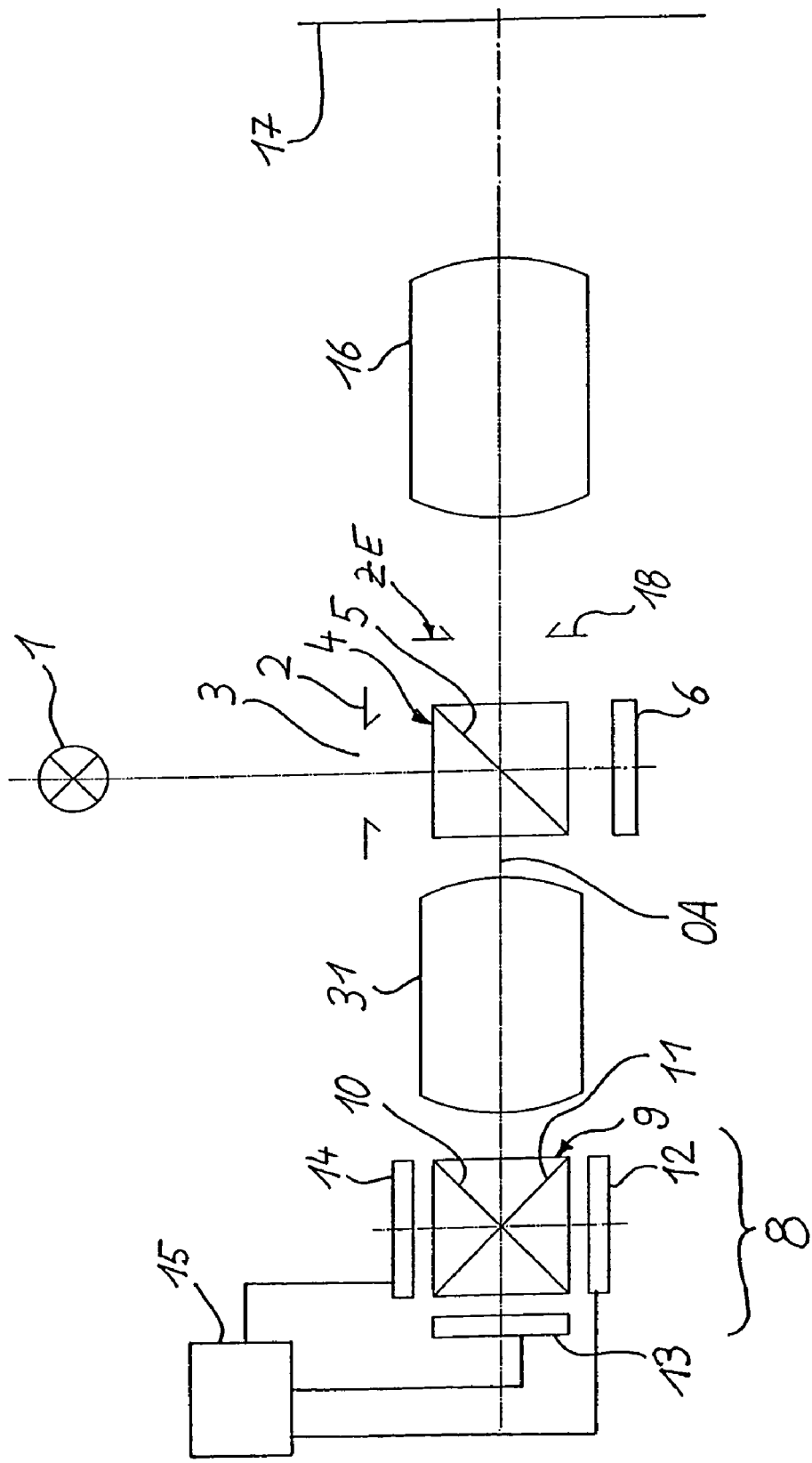
Figure 5:
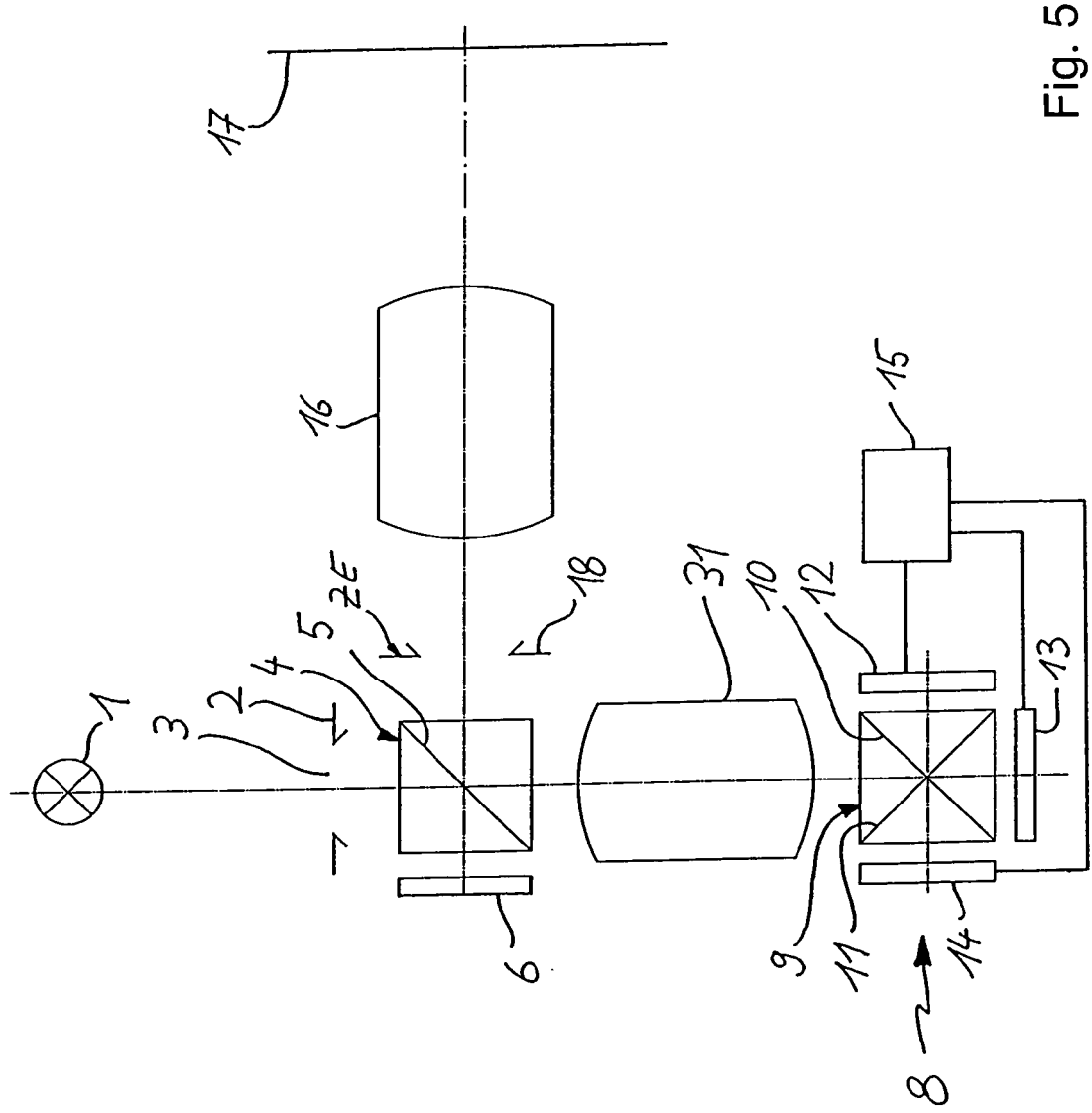
Figure 6:
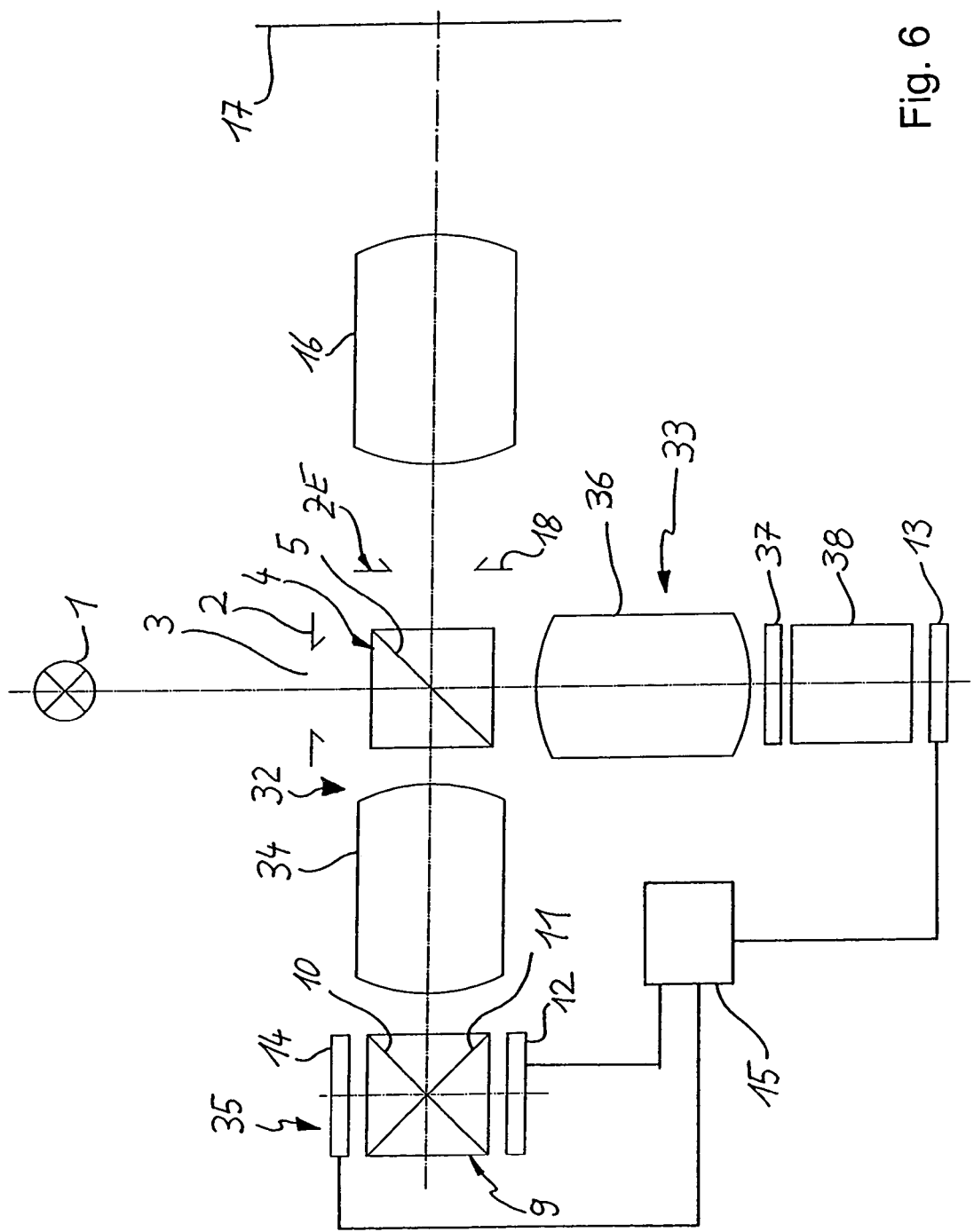
Figure 7:
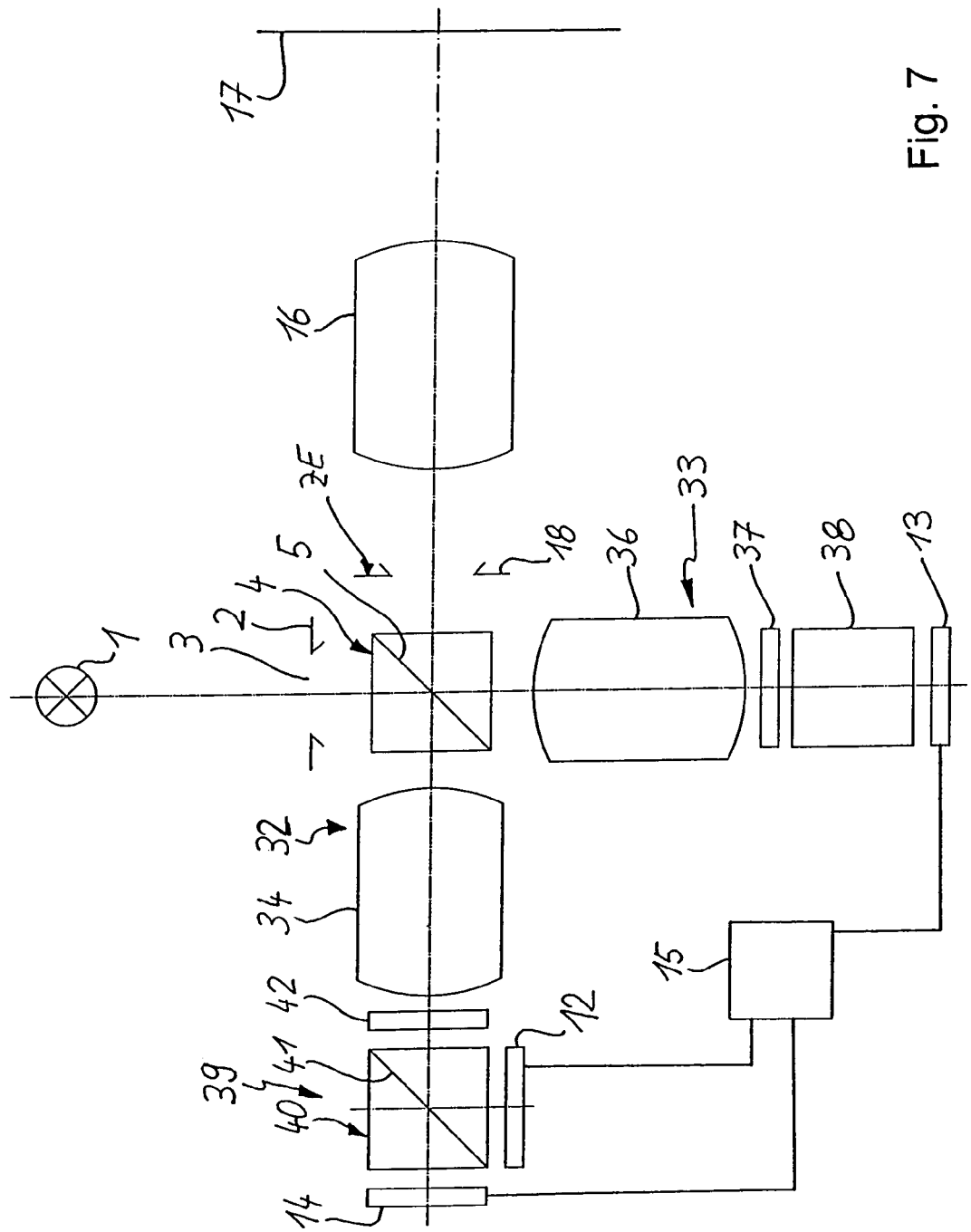
Figure 8:
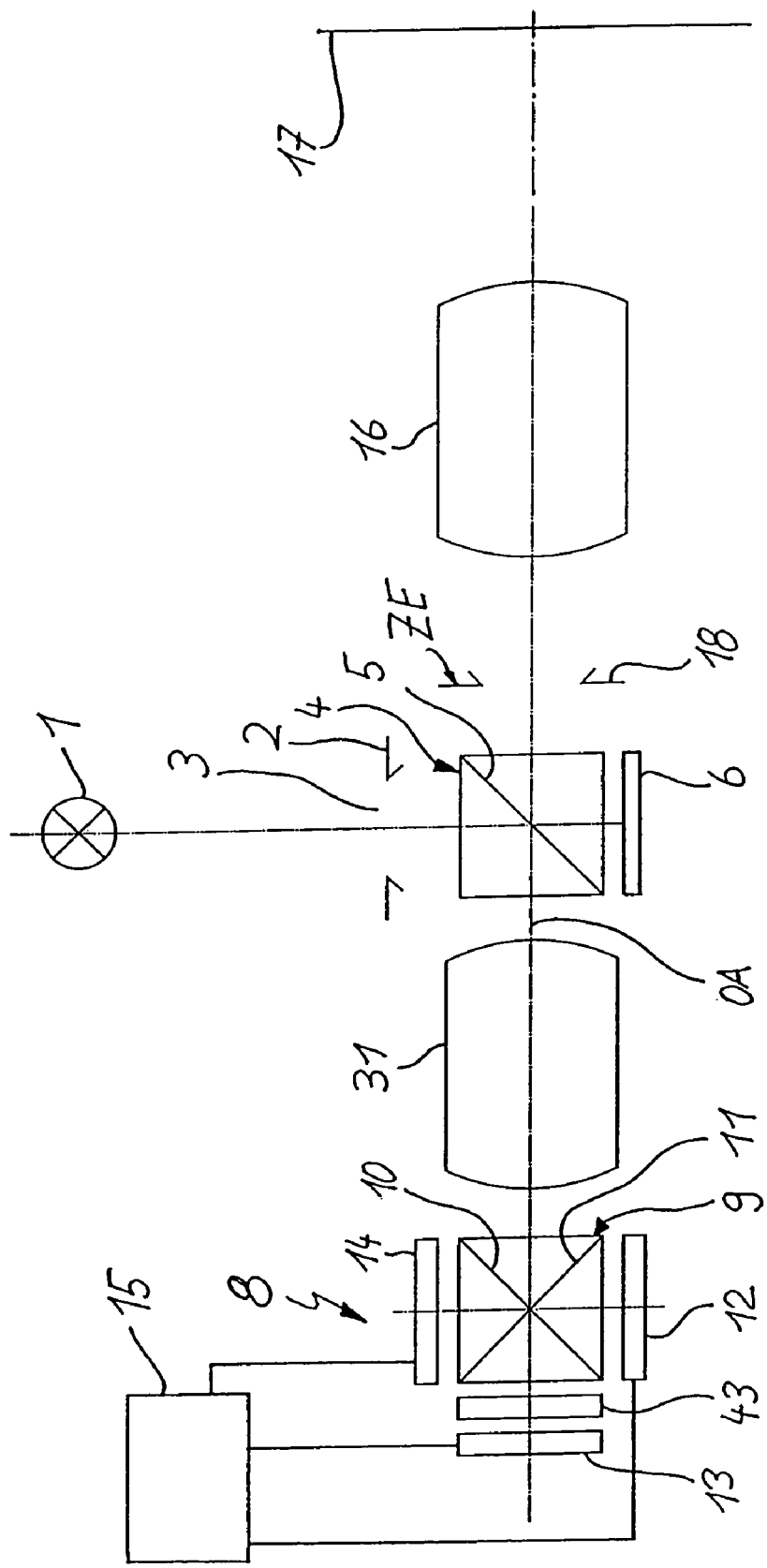
Figure 9:
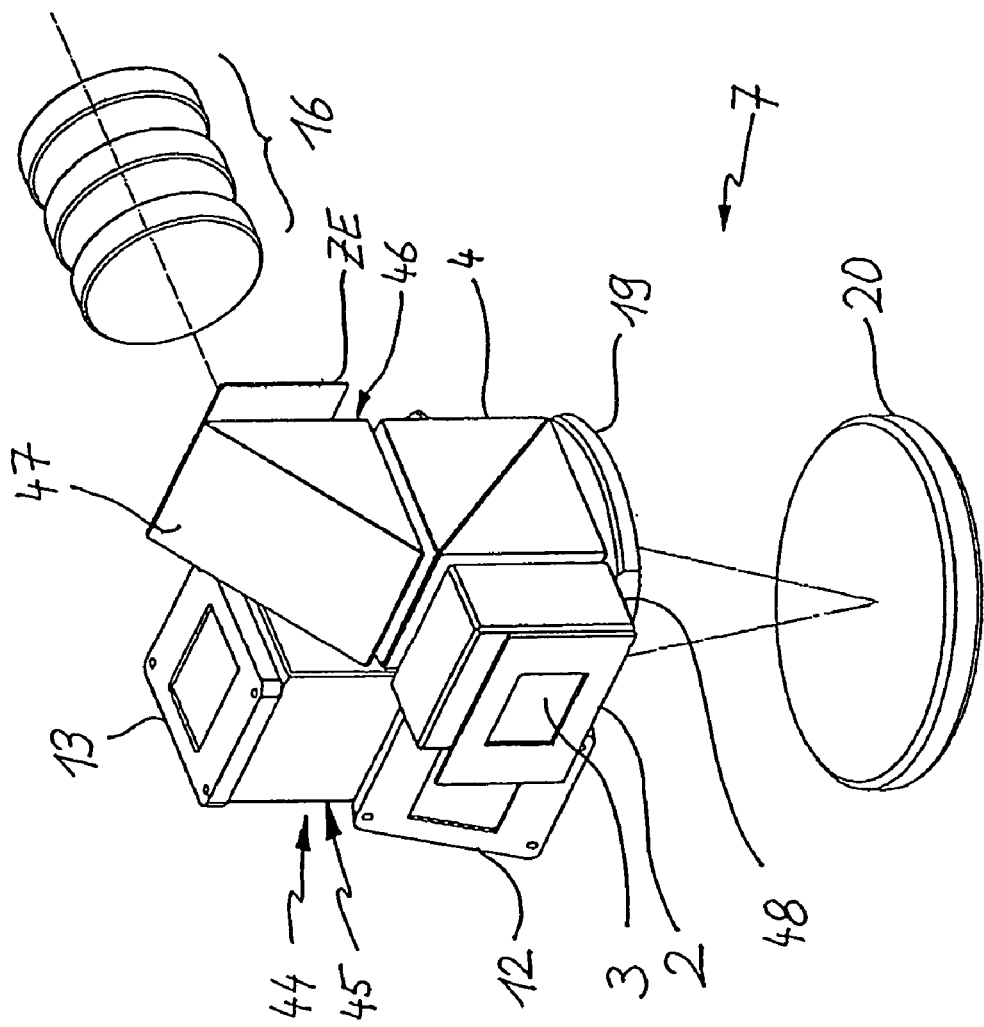

In the following, the invention is described in greater detail, using the drawings as examples. We can see:

FIG. 1 a schematic sectional depiction of the apparatus according to the invention based on a first embodiment;

FIG. 2 a schematic sectional depiction of a second embodiment of the apparatus according to the invention, wherein the optics system comprises a concave and a convex mirror;

FIG. 3 a schematic view of a further developed embodiment of the one shown in FIG. 2;

FIG. 4 a schematic view of another embodiment of the apparatus according to the invention;

FIG. 5 a schematic view of a different embodiment of the apparatus according to the invention;

FIG. 6 a schematic view of yet another embodiment of the apparatus according to the invention;

FIG. 7 a further developed embodiment of the one shown in FIG. 6;

FIG. 8 a further developed embodiment of the one shown in FIG. 4;

FIG. 9 an exploded view of another embodiment of the apparatus according to the invention;

FIG. 10a sectional view of the projection optics of the apparatus according to the invention.

As can be seen from FIG. 1, the apparatus according to the invention in its first embodiment for the purpose of projecting a picture on a projection screen includes a light source 1 (such as a halogen or an arc lamp) where its white light is received by a diaphragm 2, so that a luminous area 3 is generated in the aperture of the diaphragm 2, wherein the shape is pre-determined by the shape of the aperture. In the example shown here, the luminous area 3 includes a rectangular shape. The light of the luminous area 3 falls on a polarizing beam splitter cube 4 containing a polarizing beam splitter coating 5.

The polarizing beam splitter coating 5 of the polarizing beam splitter cube 4 reflects the light received from the luminous area 3 that is polarized linearly in a first direction (such as polarized perpendicularly to the plane of projection, s-polarization) so that linearly polarized light whose polarized direction is perpendicular to the plane of projection (seen in FIG. 1 as deflected left). Contrary thereto, the light polarized in a second direction (parallel to the plane of projection, p-polarization) passes through the polarizing beam splitter coating 5 and shines on a ray trap 6.

The light reflected at the polarizing beam splitter coating 5 (s-polarization) is being reflected on a color unit 8 by an optics system 7 arranged following the polarizing beam splitter 4.

The color unit 8 comprises a color beam splitter cube 9 having a first and a second color beam splitter coating 10, 11 that cross each other at a 90 degree angle and split the white light received from the optics system 7 into its red, green, and blue color components wherein the color components are being directed into different color channels. In addition, the color unit 8 includes three reflexive light modulators (LCD modulators) 12, 13, and 14, wherein each of them is located in one of the color channels and can be illuminated with the light of the respective color. The light modulators 12, 13, and 14 are controlled by means of a trigger unit 15 on the basis of pre-determined picture data, such that the light reflected by the light modulators 12 through 14 is modulated depending on the color frames of the picture to be modulated. Thus, polarization-modulated light is emitted by the light modulators 12 through 14, and one color frame each is generated on the light modulators 12 through 14.

The light and thus the color frames modulated by the light modulators 12, 13, 14 are reflected by the light modulators 12, 13, and 14 back to the color beam splitter cube 9 and are superimposed by it and then imagined by means of the optics system 7 into an intermediate image level ZE arranged following the polarizing beam splitter cube 4 (as will be described in detail later), and then projected to a projection screen 17 by means of a projection optics 16 arranged following the intermediate image level ZE. A diaphragm 18 is located in the intermediate image level ZE, wherein the intermediate image is located in its aperture, and wherein it includes a lateral boundary for the intermediate image.

The optics system 7 is provided such that the luminous area 7 is conjugated with the light modulators 12, 13, and 14 and/or their picture-generating areas. In addition, the picture-generating areas of the light modulators 12, 13, and 14 are conjugated with the intermediate image level ZE, wherein the optics system 7 is a symmetrical 1:1 image optics system. This is why the diaphragm 2 has been chosen such that its aperture and thus the luminous area 3 have the same size and shape as each of the equally embodied picture-generating areas of the light modulators 12, 13, and 14.

In the embodiment shown in FIG. 1, the optics system 7 includes a plano-convex lens 19 whose flat side is turned towards the polarizing beam splitter cube 4 and the color beam splitter cube 9, and a meniscus lens 20 whose side 21 is turned away from the plano-convex lens 19 and includes a silvered coating 22 which causes the path of the rays inside the optics system 7 to be folded.

The apparatus of the optics system can be seen in the following Table 1 in connection with FIG. 1:

TABLE 1

| Area Number | Bending radius (mm) | between the areas | Distance (mm) | Refractive Index | Abbe coefficient |
|---|---|---|---|---|---|
| 2 | ∞ | 2–101 | 2.00 | | |
| 101 | ∞ | 102–103 | 0.01 | | |
| 102 | ∞ | 103–104 | 27.72 | 1.5168 | 64.17 |
| 103 | ∞ | 104–105 | 271.80 | | |
| 104 | 130.088 | 105–106 | 10.40 | 1.6014 | 38.32 |
| 105 | 374.16 | 103–107 | 0.01 | | |
| 106 | 375.38 | 107–108 | 65.00 | | |
| 107 | ∞ | 108–109 | 2.00 | | |
| 108 | ∞ | | | | |
| 109 | ∞ | | | | |

The refractive index and the Abbe coefficient for the wavelength has been given as 587.6 mm here, and the polarizing beam splitter cube has a longitudinal length of 65.00 mm, so that the intermediate image level ZE is 2.00 mm away from the side turned towards the projection optics 16. The distance of the light modulators 12 and 14 to the respective sides of the color beam splitter cube 9 is 2.00 mm as well.

The optics system 7 shown in FIG. 1 is a catadioptrics optics (it includes imaging mirrors and lenses) that on the one hand generates a 1:1 image of the luminous area 3 on the LCD modulators 12 through 14, and on the other hand generates a 1:1 image of the LCD modulators 12 through 14 into the intermediate image level ZE. The diameter of the plano-convex lens 19 is at least as large as the sum of the longitudinal length of the polarizing beam splitter cube 4 and that of the color beam splitter cube 7, so that the plano-convex lens 19 is being passed through twice during the images given. The plano-convex lens 19 may advantageously be replaced by two plano-convex lenses (not shown) having a smaller diameter.

A red, a green, and a blue color frame will be pointed at the LCD modulators 12 through 14 as follows: The light originating in the luminous area 2 [sic] (preferably white light) shines on the polarizing beam splitter coating 5 of the polarizing beam splitter cube 4 that directs the light being polarized linearly perpendicularly to the plane of projection on to the optics system 7 which in turn directs it on to the color unit 8. This light is split into its red, green, and blue color components in the color beam splitter cube 9 in such a way that the first color beam splitter coating 10 reflects blue light and directs it on the LCD module 14. The remaining color components pass through the color beam splitter coating 10. The second color beam splitter coating 11 reflects red light, so that it is directed on the LCD module 12, and lets the remaining color components pass through, so that green light reaches the LCD module 13.

The LCD modulators 12 through 14 are constructed identically and comprise a rectangular picture-generating area of 18.5 mm×13.9 mm or 26.4 mm×19.8 mm, to give an example, having a majority of pixels provided in lines and columns which can be triggered independently from each other by means of the trigger unit 15, wherein at least two different states can be set for each pixel. In a first state, the light shining on the respective pixel is being reflected without changing its direction of polarization, while in the second state the direction of polarization of the reflected light is turned by 90 degrees as opposed to the polarization of the incoming light.

In order to trigger a pixel as a bright pixel, the second state is set wherein the polarization is turned 90 degrees, so that this reflected light includes a p-polarization. Whenever the pixel is supposed to be triggered as a dark picture element, it is set in the first state where it may reflect the light, but does not change its polarization. This causes a polarization-modulated color frame to be set on the LCD modulators (or the picture-generating areas). These polarization-modulated color frames are imaged in the intermediate image level ZE through the color beam splitter 9 by means of the optics system 7, wherein the light also passes through the polarizing beam splitter cube 4 that now acts as an analyzer and only allows light with a p-polarization to pass through, and reflects the s-polarized light away to the light source 1, so that only the light of the pixels with a bright setting are imaged in the intermediate image level ZE.

The intermediate image thus imaged in the intermediate image level ZE is then projected on the projection screen 17 by means of the projection optics 16.

FIG. 2 shows another embodiment of the apparatus according to the invention for the purpose of projecting a picture on a projection screen, wherein this apparatus differs from that shown in FIG. 1 such that instead of the optics system 7, it has an optics system 23. All other elements correspond to those in FIG. 1, and have been given the same drawing references. For a description of these elements, please see the respective description of FIG. 1.

The optics system 23 includes a first and a second spherical mirror 24 and 25 that are provided such that they comprise a common optical axis and that their centers of curvature meet in a point K that is located in the intermediate image level ZE, wherein the first mirror 24 is concave, and the second mirror 25 is convex. The mirrors 24 and 25 are provided such that the light received from the polarizing beam splitter cube 4 shines on the first mirror 24, is there reflected to the second mirror 25 that in turn reflects the light back to the first mirror 24 from where it is then directed to the color unit 8 (the path of the ray within the optics system 23 is thus W-shaped).

The radiuses of curvature R1 and R2 of the two mirrors 24 and 25 are selected such that the radius of curvature R1 of the first mirror 24 is twice as large as the radius of curvature R2 of the second mirror 25. The optics system 23 thus includes only two mirrors 24 and 25, which provides a 1:1 imaging system consisting of only two components having a multiply folded path of the rays with which can be realized a very compact projection apparatus, yet having great light transmitting intensity.

A further embodiment of the projection apparatus shown in FIG. 2 is shown in FIG. 3, wherein the two mirrors are realized by curved and silvered boundary surfaces 26, 27 of a glass block 28. In addition, contrary to the embodiment shown in FIG. 2, a first glass adapter 29 optically connecting the polarizing beam splitter cube 4 with the glass block 28, and a second glass adapter 30 optically connecting the color beam splitter cube 9 with the glass adapter 28, are provided. The glass adapters 29 and 30 are preferably cemented to the glass block 28, the polarizing beam splitter cube 4 and the color beam splitter 9, but they may be wrung together as well.

Another advantage of using the glass block 28 and the glass adapters 29, 30 (if provided) is that the angle of beam spread of the electrical brush aigrette[1] inside the glass object is smaller than in air, so that the entire system can be more compact.

[1] This appears to be an error in the German patent, where the term nused is Strahlenbüschel. The otherwise identical paragraph in patent 3081.17 has the word Strahlenbüschel, luminous beam.—(Translator's Note)

It is advantageous in this embodiment that compared to an arrangement without the glass adapters 29 and 30 the number of the glass-air boundary surfaces is reduced. Glass-air boundary surfaces are prone to contamination. In addition, the mirrors are formed by the silvered boundary surfaces 26 and 27 which means that these silvered areas do not have any boundary surface in the air and thus cannot be contaminated. The embodiment shown in FIG. 3 can naturally also be realized without the glass adapters 29 and 30.

FIG. 4 shows another embodiment of the projection apparatus according to the invention, one which differs from the embodiment shown in FIG. 1 such that the color unit 8 includes a joint optical axis OA with the polarizing beam splitter cube 4 and the projection optics 16. In addition, an optics system 31 is provided between the color unit 8 and the polarizing beam splitter cube 4, wherein the optical axis of the optics system 31 is the same as the optical axis OA and includes no mirror element but only lenses, so that the path of the rays inside the optics system 31 is not folded. The remaining elements are the same as the elements shown in FIG. 1 and have been given the same drawing references. For a description of these elements, please see the respective description of FIG. 1.

In the embodiment shown in FIG. 4, the optics system 31 also implements a 1:1 image of the luminous area 3 on the picture-generating areas of the light modulators 12 through 14 and a 1:1 image of the color frames pointed on the light modulators 12 through 14 in the intermediate image level ZE. One skilled in the art can easily decide on the exact apparatus of the optics system 31 if he is told that the optics system is supposed to implement the 1:1 images.

Another embodiment of the projection apparatus according to the invention is shown in FIG. 5. This embodiment differs from that shown in FIG. 4 in that the light of the light source 1 passing through the polarizing beam splitter coating 5 and thus polarized linearly with the plane of projection (p-polarization) is utilized to light the picture-generating areas of the LCD modulators 12 through 14. The part arranged following the polarizing beam splitter cube 4 of the projection apparatus (namely the optics apparatus 31 and the color unit 8) is identical with the respective part in the projection apparatus shown in FIG. 4, so that the parts are identified with the same drawing references and the description can be taken from that of FIG. 4.

In the embodiment shown in FIG. 5, linearly polarized light is being used with the p-polarization in order to light the LCD modulators 12 through 14, so that the bright picture elements are realized with linearly polarized light of the s-polarization, since this light is being reflected to the right in the polarizing beam splitter coating 5 of the polarizing beam splitter cube 4 as seen in FIG. 5.

FIG. 6 shows another embodiment of the projection apparatus according to the invention that shows largely a combination of the embodiments shown in FIGS. 4 and 5, wherein the light divided by the polarizing beam splitter coating 5 of the polarizing beam splitter cube 4 spreads into a first arm 32 and a second arm 33 positioned perpendicularly thereto. The first arm 32 includes a 1:1 image optics 34 arranged following the polarizing beam splitter cube 4 which in turn is arranged following a color frame generator 35. The color frame generator 35 includes the color beam splitter cube 9 having the first and the second color beam splitter coatings 10, 11, and the two LCD modulators 12, 14. The color frame generator 35 thus differs from the color frame generator 8 only in that the second LCD module 13 has been left out.

Inside the second arm 33, a 1:1 image optics 36 has been arranged following the polarizing beam splitter cube 4, wherein a green filter 37, a glass block 38, and a LCD module 13 are arranged following in this order.

The green filter 37 only lets green light through, so that the green color frame can be set using the LCD module 13. The length of the glass block 38 is chosen to ensure that the glass way for the green color frame is equal to the glass way for the red and blue color frame in the first arm 32.

In the embodiment shown in FIG. 6, the red and blue color frames are thus set with the linearly polarized light of the s-polarization in the first arm 32, and the green light is set with the linearly polarized light of the p-polarization in the second arm 33. The set color frames are in turn imaged with the 1:1 image optics 34, 36 in the intermediate image level ZE and superimposed there, so that a multi-colored intermediate image is generated that can be projected on the projection screen 17 by means of the reflection optics 16. Using the apparatus shown in FIG. 6, the color brilliance of the multi-colored image can be improved since the green filter 37 tops the LCD module 13 clearly with green light and not with the light that will be allowed to pass through not only the first but also the second color beam splitter coating 10, 11 and thus may contain a certain amount of red and/or blue color component.

FIG. 7 shows another embodiment of the apparatus for projecting a picture according to the invention, wherein that embodiment differs from that shown in FIG. 6 in that instead of the color frame generator 35 a color frame generator 39 provided (the other elements are the same as those in the embodiment shown in FIG. 6 and will therefore not be described again). The color frame generator 39 includes a color beam splitter cube 40 having a color beam splitter coating 41 arranged following the image optics 34, wherein the color beam splitter cube 40 is tipped 45 degrees vis-à-vis the optical axis of the 1:1 image optics 34, and a first and a second LCD module 12, 14, provided such that the light passing through the color beam splitter coating 40 falls on the second LCD module 14. In addition, the color frame generator 39 includes a rejection filter 42 that is provided between the color beam splitter cube 40 and the 1:1 image optics 34 and that filters the green color components out of the light shining thereon and blocks it. The color beam splitter coating 41 of the color beam splitter cube 40 reflects the blue light component and allow the remaining light component (In that case red) to pass through, so that a blue and a red color frame can be set on the LCD modulators 12 and 14. In this embodiment, the apparatus of the color beam splitter cube 40 is simplified, since it only includes a color beam splitter coating 41 and no color beam splitter coatings crossing each other.

FIG. 8 shows a further developed embodiment of the one shown in FIG. 4, wherein the difference is that between the color beam splitter cube 9 and the second LCD module 13 a color filter 43 is additionally provided that only allows green light to pass through. This advantageously means that the possibly existing red and/or blue color components of the light passing through the color beam splitter coatings 10, 11 are filtered out, so that it can be ensured that the LCD module 13 is topped by green light only. This increases the color brilliance of the multi-colored image projected.

Another embodiment of the apparatus according to the invention is shown in the exploded view in FIG. 9, wherein the design of the optics system 7 and its apparatus relative to the polarizing beam splitter cube 4 is identical to the embodiment shown in FIG. 1. The difference to the embodiment shown in FIG. 1 is, however, that it does not have the color frame generator 8, but instead a color frame generator 44 having a prism structure 45. In general, the prism structure is identical to the design of the prism structure shown in FIG. 2 of EP 0 734 183 A2. In addition, the embodiment shown in FIG. 9 has a deviating prism 46 located between the polarizing beam splitter cube 4 and the intermediate image level ZE, wherein the deviating prism 46 turns the spread direction of the light by 90 degrees. To that end, the respective boundary surface 47 of the deviating prism 46 can be silvered, however preferably total internal reflection (total reflection) is utilized (in that case the boundary surface 47 is not silvered). Finally, a glass block 48 is provided between the diaphragm 2 and the polarizing beam splitter cube 4, wherein the glass block's [word missing] are chosen such that the glass ways reaching from the luminous area 3 up to the LCD modulators 12 through 14 are equal to that of the glass way reaching from the LCD modulators 12 through 14 up to the intermediate image level ZE. The embodiment shown in FIG. 9 has the advantage that it can be very compact because of the deviation by means of the deviating prism 46. Instead of the deviating prism 46, any other optical element may be used that is able to turn the path of the rays 90 degrees.

Figure 10:
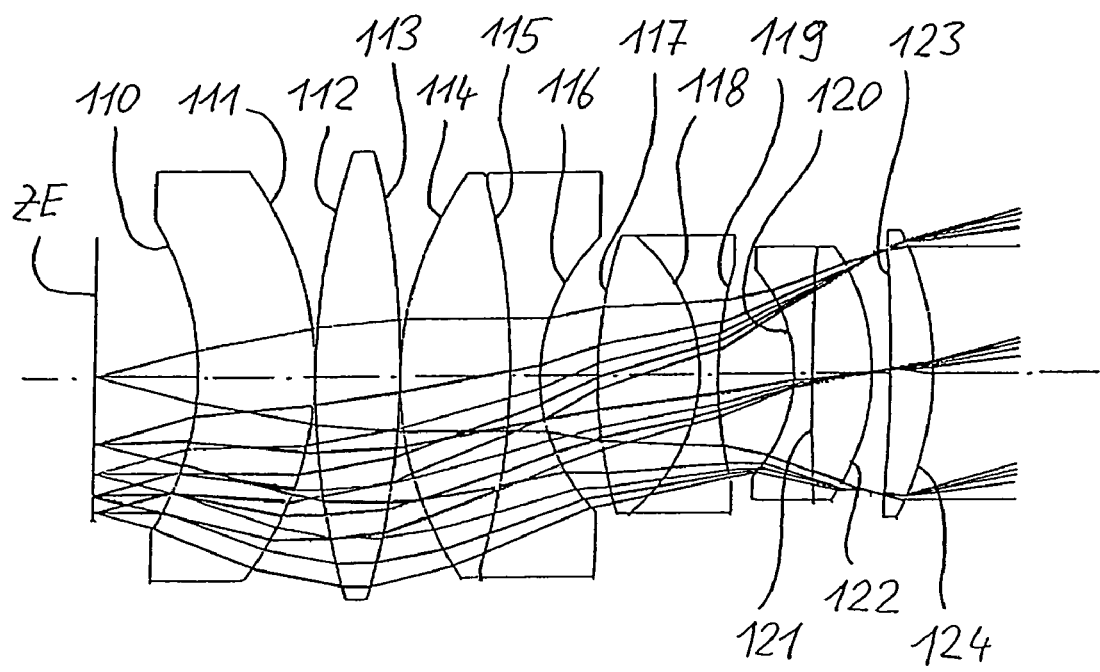

FIG. 10 shows a possible embodiment of the projection optics 16, which can be used with any of the embodiments described above. The exact design of the reflection optics 16 may be taken from the Table below, wherein the refractive index and the Abbe coefficient have been given for a wave-length of 587.6 mm.

TABLE 2

| Area Number | Bending radius (mm) | Between the areas | Distance (mm) | Refractive Index | Abbe coefficient |
|---|---|---|---|---|---|
| 110 | 34.478 | ZE–110 | 12.18 | | |
| 111 | 39.999 | 110–111 | 14.00 | 1.803181 | 46.3799 |
| 112 | –90.065 | 111–112 | 0.10 | | |
| 113 | 103.131 | 112–113 | 10.00 | 1.803181 | 46.3799 |
| 114 | –42.048 | 113–114 | 0.10 | | |
| 115 | 83.089 | 114–115 | 13.00 | 1.617999 | 63.3335 |
| 116 | –22.786 | 115–116 | 3.60 | 1.558361 | 54.1572 |
| 117 | –53.434 | 116–117 | 6.80 | | |
| 118 | 21.066 | 117–118 | 12.00 | 1.617999 | 63.3335 |
| 119 | –50.036 | 118–119 | 2.20 | 1.620040 | 36.3665 |
| 120 | 18.361 | 119–120 | 8.85 | | |
| 121 | –342.74 | 120–121 | 2.20 | 1.717359 | 29.5128 |
| 122 | 27.12 | 121–122 | 7.00 | 1.617999 | 63.3335 |
| 123 | 202.45 | 122–123 | 2.20 | | |
| 124 | 37.417 | 123–124 | 5.00 | 1.850254 | 32.1699 |

The invention claimed is:

1. Apparatus for projecting a picture on a projection screen, comprising a light source for emitting light, wherein the light source can generate a luminous area, a reflective light modulator that can be illuminated with light emanating from the luminous area and that can modulate the light for the purpose of generating a picture, a projection optics which is arranged following the light modulator and can be illuminated with the modulated light for projecting the picture on the projection screen, the apparatus further comprising an optics system arranged in front of the light modulator, wherein the optics system images light received from the luminous area on the light modulator, and images the light modulated by the light modulator in an intermediate image level that is located in front of the projection optics for generating an intermediate image in the intermediate image level, wherein the projection optics can project that intermediate image on the projection screen and wherein the optics system comprises catadioptric optics.

2. Apparatus according to claim 1, wherein the optics system comprises 1:1 image optics.

3. Apparatus according to claim 1, wherein the optics system is symmetrical.

4. Apparatus according to claim 1, wherein the optics system further comprises a curved mirror and wherein the mirror of the optics system is provided as a reflective coating on the curved boundary surface of a transparent optics element turned away from the light modulator.

5. Apparatus according to claim 1, wherein the light source generates multi-colored light, and comprising a color unit between the optics system and the light modulator, and a second light modulator following the color unit, wherein the color unit can be illuminated with light of the luminous area via the optics system and separates light of a first color and directs it on a first light modulator, and separates light of a second color and directs it on a second light modulator, wherein the light modulators modulate the light shining on them, in order to set a color frame each and reflect the modulated light back to the color unit that superimposes the reflected light into a common luminous beam and directs it to the optics system.

6. Apparatus according to claim 5, wherein the apparatus includes a third light modulator arranged following the color unit, wherein the color unit separates tight of a third color unit from the light it is illuminated with and directs it on the third light modulator that modulates the light shining thereon, in order to set a third color frame, and then reflects the modulated light back to the color unit.

7. Apparatus according to claim 8, further comprising a red color frame that can be set on the first light modulator, a green color frame that can be set on the second light modulator, and a blue color frame that can be set on the third light modulator.

8. Apparatus according to claim 1, wherein the light modulators modulate the state of polarization of the light shining on them, and an analyzer is arranged in front of the intermediate image level which causes only light modulated with pre-determined state of polarization to be received at the intermediate image level.

9. Apparatus according to claim 8, wherein the analyzer is positioned between the intermediate image level and the optics system.

10. Apparatus according to claim 8, wherein the analyzer comprises a polarizing beam splitter that admits light from the luminous area and of that light directs only tight of a first state of polarization to the optics system and the light received from the optics system directs only light of a second state of polarization to the intermediate image level.

11. Apparatus according to claim 10, wherein the light of the first and second state of polarization is polarized linearly, and wherein the two linear states of polarization are oriented 90 degrees vis-à-vis each other.

12. Apparatus according to claims 1, wherein the optics system comprises a piano-convex lens and a silvered meniscus lens.

13. Apparatus according to claim 1, wherein the optics system comprises a concave mirror and a convex mirror.

14. Apparatus according to claim 13, wherein the concave and the convex mirrors comprise the silvered outer surfaces of a glass object.

15. Apparatus according to claim 1, wherein the optics system comprises a concave mirror and a convex mirror.

16. Apparatus for projecting a picture on a projection screen, comprising:
   a light source for emitting light, wherein the light source can generate a luminous area;
   a reflective light modulator that can be illuminated with light emanating from the luminous area and that can modulate the light for the purpose of generating a picture;
   projection optics arranged following the light modulator that can be illuminated with the modulated light for projecting the picture on a projection screen; and
   an optics system arranged in front of the light modulator, the optics system including a curved mirror, wherein the optics system images light received from the luminous area on the light modulator and images the light modulated by the light modulator in an intermediate image level that is located in front of the projection optics to generate an intermediate image in the intermediate image level, wherein the projection optics project the intermediate image on the projection screen.

17. Apparatus according to claim 16, wherein the optics system comprises 1:1 image optics.

18. Apparatus according to claim 16, wherein the optics system is symmetrical.

19. Apparatus according to claim 16, wherein the curved mirror of the optics system is provided as a reflective coating on the curved boundary surface of a transparent optics element turned away from the light modulator.

20. Apparatus according to claim 16, wherein the optics system comprises catadioptric optics.

21. Apparatus according to claim 16, wherein the light source generates multi-colored light, and comprising a color unit between the optics system and the light modulator, and a second light modulator following the color unit, wherein the color unit can be illuminated with light of the luminous area via the optics system and separates light of a first color and directs it on a first light modulator, and separates light of a second color and directs it on a second light modulator, wherein the light modulators modulate the light shining on them, in order to set a color frame each and reflect the modulated light back to the color unit that superimposes the reflected light into a common luminous beam and directs it to the optics system.

22. Apparatus according to claim 21, wherein the apparatus includes a third light modulator arranged following the color unit, wherein the color unit separates light of a third color from the light it is illuminated with and directs it on the third light modulator that modulates the light shining thereon, in order to set a third color frame, and then reflects the modulated light back to the color unit.

23. Apparatus according to claim 22, further comprising a red color frame that can be set on the first light modulator, a green color frame that can be set on the second light modulator, and a blue color frame that can be set on the third light modulator.

24. Apparatus according to claim 16, wherein the light modulators modulate the state of polarization of the light shining on them, and an analyzer is arranged in front of the intermediate image level which causes only light modulated with pre-determined state of polarization to be received at the intermediate image level.

25. Apparatus according to claim 24, wherein the analyzer is positioned between the intermediate image level and the optics system.

26. Apparatus according to claim 24, wherein the analyzer comprises a polarizing beam splitter that admits light from the luminous area and of that light directs only light of a first state of polarization to the optics system and the light received from the optics system directs only light of a second state of polarization to the intermediate image level.

27. Apparatus according to claim 26, wherein the light of the first and second state of polarization is polarized linearly, and wherein the two linear states of polarization are oriented 90 degrees vis-à-vis each other.

28. Apparatus according to claims 16, wherein the optics system comprises a piano-convex lens and a silvered meniscus lens.

* * * * *

UNITED STATES PATENT AND TRADEMARK OFFICE
CERTIFICATE OF CORRECTION

| | |
|---|---|
| PATENT NO. | : 7,001,026 B2 |
| APPLICATION NO. | : 10/433534 |
| DATED | : February 21, 2006 |
| INVENTOR(S) | : Guenter Rudolph et al. |

It is certified that error appears in the above-identified patent and that said Letters Patent is hereby corrected as shown below:

<u>Title page,</u>
Item [75], Inventors, add -- Marco Pretorius, Oberkochen (DE) --.

Signed and Sealed this

Twenty-fifth Day of July, 2006

JON W. DUDAS
*Director of the United States Patent and Trademark Office*